United States Patent
Ogawa et al.

(10) Patent No.: US 11,749,835 B2
(45) Date of Patent: Sep. 5, 2023

(54) SOLID ELECTROLYTE SHEET AND SOLID STATE BATTERY

(71) Applicant: Honda Motor Co., Ltd., Tokyo (JP)

(72) Inventors: Atsushi Ogawa, Saitama (JP); Ushio Harada, Saitama (JP); Hiroto Maeyama, Saitama (JP); Toru Sukigara, Saitama (JP); Kazuki Chiba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 16/673,964

(22) Filed: Nov. 5, 2019

(65) Prior Publication Data

US 2020/0144661 A1    May 7, 2020

(30) Foreign Application Priority Data

Nov. 6, 2018    (JP) .................................. 2018-208932

(51) Int. Cl.
   *H01M 10/0562*    (2010.01)

(52) U.S. Cl.
   CPC ............................... *H01M 10/0562* (2013.01)

(58) Field of Classification Search
   CPC ......................... H01M 10/0562; H01M 10/052
   See application file for complete search history.

(56) References Cited

U.S. PATENT DOCUMENTS

| | | | |
|---|---|---|---|
| 2015/0318570 A1 | 11/2015 | Choi et al. | |
| 2015/0349379 A1* | 12/2015 | Hozumi | H01M 10/0562 |
| | | | 429/304 |
| 2018/0166741 A1* | 6/2018 | Xu | H01M 10/0486 |
| 2018/0375148 A1* | 12/2018 | Yersak | H01M 50/403 |

FOREIGN PATENT DOCUMENTS

| | | |
|---|---|---|
| CN | 110416630 | 11/2019 |
| JP | H10284126 | 10/1998 |
| JP | 2000106154 | 4/2000 |
| JP | 2013127982 | 6/2013 |
| JP | 2014096311 | 5/2014 |
| JP | 2015153460 | 8/2015 |
| JP | 2016009679 | 1/2016 |
| JP | 2016031789 | 3/2016 |
| KR | 20030034735 | 5/2003 |

OTHER PUBLICATIONS

Office Action of Japan Counterpart Application, with English translation thereof, dated Jan. 25, 2022, pp. 1-6.
"Office Action of Japan Counterpart Application" with English translation thereof, dated Sep. 14, 2021, p. 1-p. 8.
"Office Action of China Counterpart Application", dated Nov. 30, 2022, with English translation thereof, pp. 1-23.

\* cited by examiner

*Primary Examiner* — Osei K Amponsah
(74) *Attorney, Agent, or Firm* — JCIPRNET

(57) ABSTRACT

Provided is a solid electrolyte sheet having a self-supporting property while having a small thickness and flexibility. The solid electrolyte sheet is formed using a support having a specific porosity and a specific thickness. Specifically, the solid electrolyte sheet is formed in which a solid electrolyte is filled in a support having a porosity of 60% or more and 95% or less and a thickness of 5 μm or more and less than 20 μm.

4 Claims, No Drawings

SOLID ELECTROLYTE SHEET AND SOLID STATE BATTERY

CROSS-REFERENCE TO RELATED APPLICATION

This application claims the priority benefit of Japan Application No. 2018-208932, filed on Nov. 6, 2018. The entirety of the above-mentioned patent application is hereby incorporated by reference herein and made a part of this specification.

BACKGROUND

Technical Field

The disclosure relates to a solid electrolyte sheet and a solid state battery.

Related Art

Conventionally, lithium ion secondary batteries have been widely used as secondary batteries having high energy density. A lithium ion secondary battery has a structure in which a separator is present between a positive electrode and a negative electrode and a liquid electrolyte (electrolytic solution) is filled.

Here, since the electrolytic solution of the lithium ion secondary battery is usually a flammable organic solvent, there are particularly problems with safety concerning heat. Therefore, a lithium ion solid state battery using an inorganic solid electrolyte in place of an organic liquid electrolyte has been proposed (see Patent Document 1).

The lithium ion solid state battery is a battery having a solid electrolyte layer between a positive electrode layer and a negative electrode layer. The solid electrolyte layer has a function of conducting lithium ions and a function as a separator that prevents a short circuit between a negative electrode active material layer and a positive electrode active material layer. Here, the solid electrolyte layer serving as the separator is preferably formed as thin as possible in order to improve energy density, while being desirably self-supporting.

For this demand, a solid electrolyte sheet in which a support having an opening is used and a solid electrolyte is filled in the opening has been proposed (see Patent Documents 2 and 3).

However, in the solid electrolyte sheet described in Patent Document 2, the thickness is not thin enough for the purpose of preventing a short circuit, and further improvement has been required. In addition, in the solid electrolyte sheet described in Patent Document 3, since its material is polyethylene terephthalate, there is a problem with heat resistance. Also, its thickness is 10 μm to 25 μm, and further thinning has been required.

PATENT DOCUMENTS

Patent Document 1: Japanese Laid-open No. 2000-106154
Patent Document 2: Japanese Laid-open No. 2013-127982
Patent Document 3: Japanese Laid-open No. 2016-031789

SUMMARY

The disclosure provides a solid electrolyte sheet having a self-supporting property while having a small thickness and flexibility.

The inventors have conducted earnest studies on the support of the solid electrolyte sheet, and have discovered that the above problems can be solved if a solid electrolyte sheet is formed using a support having a specific porosity and a specific thickness, thereby accomplishing the disclosure.

That is, the disclosure is a solid electrolyte sheet in which a solid electrolyte is filled in a support, wherein the support has a porosity of 60% or more and 95% or less and a thickness of 5 μm or more and less than 20 μm.

Another embodiment of the disclosure provides a solid state battery including a positive electrode layer containing a positive electrode active material, a negative electrode layer containing a negative electrode active material, and a solid electrolyte layer located between the positive electrode layer and the negative electrode layer, wherein the solid electrolyte layer includes the above solid electrolyte sheet.

DESCRIPTION OF THE EMBODIMENTS

The embodiments of the disclosure are hereinafter described.

<Solid Electrolyte Sheet>

A solid electrolyte sheet of the disclosure is a solid electrolyte sheet in which a solid electrolyte is filled in a support, and is characterized in that the support has a porosity of 60% or more and 95% or less and a thickness of 5 μm or more and less than 20 μm.

[Support]

The support constituting the solid electrolyte sheet of the disclosure is a porous self-supporting sheet.

(Porosity)

The support constituting the solid electrolyte sheet of the disclosure has a porosity in the range of 60% to 95%. The porosity is preferably 70% to 90%, and more preferably 80% to 90%. Since the porosity is in the above range, the self-supporting property can be maintained while a decrease in ionic conductivity is suppressed.

Moreover, the porosity in the disclosure means a proportion of gaps per unit volume, which is expressed in percentage. Specifically, the porosity can be obtained from basis weight (g/m$^2$), sheet thickness (μm), and a sheet material's density (g/cm$^3$) by the following equation (1).

[Equation 1]

$$\text{Porosity (\%)} = (1 - \text{basis weight}(g/m^2)/\text{sheet thickness}(\mu m)/\text{sheet material's density}(g/cm^3))*100 \quad (1)$$

(Thickness)

The support constituting the solid electrolyte sheet of the disclosure has a thickness in the range of 5 μm or more and less than 20 μm. The thickness of the support is preferably 5 μm to 15 μm, and more preferably 5 μm to 10 μm. If less than 5 μm, there is a risk that a short circuit may occur between electrodes when a battery is formed; on the other hand, if 20 μam or more, it is difficult to realize a battery having high energy density.

(Structure)

The support constituting the solid electrolyte sheet of the disclosure is preferably a woven fabric or a nonwoven fabric. If the support is a woven fabric or a nonwoven fabric, the above porosity and thickness can be easily satisfied, and the solid electrolyte can be easily filled therein.

(Material)

A material of the support constituting the solid electrolyte sheet of the disclosure is not particularly limited and may be any material that can constitute a self-supporting sheet. For example, there may be mentioned polyethylene terephthalate, nylon, aramid, $Al_2O_3$, glass and so on.

The support constituting the solid electrolyte laminated sheet of the disclosure is preferably composed of, among the above, a heat-resistant fiber. Since the support is composed of a heat-resistant fiber, in a solid state battery manufacturing process or the like, a short circuit can be suppressed even if pressing is performed at a high temperature exceeding, for example, 200° C. In addition, the solid electrolyte can be sintered by high-temperature pressing, and as a result, interfacial resistance can be reduced and the battery's output can be improved.

Moreover, the support constituting the solid electrolyte sheet of the disclosure is preferably, among heat-resistant fibers, an aramid fiber or an $Al_2O_3$ fiber. If the support is an aramid fiber or an $Al_2O_3$ fiber, fiber deformation due to heat is reduced.

[Solid Electrolyte]

A solid electrolyte used in the solid electrolyte sheet of the disclosure is not particularly limited and may be anything capable of conducting lithium ions between a positive electrode and a negative electrode. For example, there may be mentioned an oxide-based electrolyte or a sulfide-based electrolyte. In addition, other components such as a binder or the like may be added if necessary.

(Lithium Element)

The solid electrolyte used in the solid electrolyte sheet of the disclosure preferably contains a lithium element. The solid electrolyte preferably contains a substance synthesized from at least lithium sulfide as a first component, and one or more compounds selected from the group consisting of silicon sulfide, phosphorus sulfide and boron sulfide as a second component. In view of the lithium ion conductivity, $Li_2S$—$P_2S_5$ is particularly preferred.

If the solid electrolyte used in the solid electrolyte sheet of the disclosure is a sulfide-based electrolyte, the solid electrolyte may further contain a sulfide such as $SiS_2$, $GeS_2$, $B_2S_3$ or the like. In addition, $Li_3PO_4$ or halogen, a halogen compound and so on may be added to the solid electrolyte as appropriate.

If the solid electrolyte used in the solid electrolyte sheet of the disclosure is a lithium ion conductor composed of an inorganic compound, $Li_3N$, LISICON, LIPON ($Li_{3+y}PO_{4-x}N_x$), Thio-LISICON ($Li_{3.25}Ge_{0.25}P_{0.75}S_4$), and $Li_2O$—$Al_2O_3$—$TiO_2$—$P_2O_5$ (LATP) and so on may be mentioned as examples thereof.

The solid electrolyte used in the solid electrolyte sheet of the disclosure may have an amorphous structure, a glassy structure, a crystal (crystallized glass) structure or the like. If the solid electrolyte is a sulfide-based solid electrolyte composed of $Li_2S$—$P_2S_5$, the lithium ion conductivity of an amorphous body is about $10^{-4} Scm^{-1}$. On the other hand, the lithium ion conductivity in the case of a crystalline body is about $10^{-3} Scm^{-1}$.

(Phosphorus or Sulfur)

The solid electrolyte used in the solid electrolyte sheet of the disclosure preferably contains phosphorus and/or sulfur. Since the solid electrolyte further contains phosphorus and/or sulfur, the ionic conductivity of the obtained solid state battery can be improved.

<Method for Manufacturing Solid Electrolyte Sheet>

A method for manufacturing the solid electrolyte sheet of the disclosure is not particularly limited, and a general method in the art can be applied.

For example, there may be mentioned a method in which a slurry is prepared in which a solid electrolyte is dissolved in a solvent, and the prepared slurry is coated on a support and dried. The solvent used in preparing the slurry of the solid electrolyte is not particularly limited if it has no adverse effect on the performance of the solid electrolyte. For example, there may be mentioned a non-aqueous solvent.

A coating method for coating the slurry containing the solid electrolyte on both sides or one side of the support is not particularly limited, and slide die coating, comma die coating, comma reverse coating, gravure coating, gravure reverse coating and so on may be mentioned as examples thereof.

The drying performed after coating of the slurry containing the solid electrolyte can be performed by a drying device using, for example, hot wind, a heater, high frequency or the like.

Moreover, the solid electrolyte sheet of the disclosure may be the dried sheet as it is, but can also be further pressed to be increased in strength or density. As examples of a pressing method, there may be mentioned sheet pressing or roll pressing or the like.

As another method, there may be mentioned a method in which a solid electrolyte is made into a sheet when in the powder state, without being made into a slurry. In this case, a sandblasting method (SB method), an aerosol deposition method (AD method) and so on may be mentioned as examples thereof. The solid electrolyte may be collided at high speed to accumulate in and fill an opening of the support, or the solid electrolyte may be sprayed as it is.

Further, an autoclave method can also be adopted in which the powder of the solid electrolyte is placed on the support in an inert gas and suctioned from below the support, and the solid electrolyte is filled in the support. Alternatively, there may also be mentioned a method in which the powder of the solid electrolyte is placed on the support, and is filled in voids of the support by being pressed using a pressing machine or the like.

<Solid State Battery>

A solid state battery of the disclosure is a solid state battery including a positive electrode layer containing a positive electrode active material, a negative electrode layer containing a negative electrode active material, and a solid electrolyte layer located between the positive electrode layer and the negative electrode layer, wherein the solid electrolyte layer includes the above solid electrolyte sheet.

[Positive Electrode and Negative Electrode]

In the solid state battery of the disclosure, the positive electrode active material used in the positive electrode layer and the negative electrode active material used in the negative electrode layer are not particularly limited, and may be anything if they function as a positive electrode and a negative electrode of a lithium ion solid state battery.

As examples of the positive electrode active material, in the case of a sulfide-based material, there may be mentioned titanium sulfide ($TiS_2$), molybdenum sulfide ($MoS_2$), iron sulfide (FeS, $FeS_2$), copper sulfide (CuS) and nickel sulfide ($Ni_3S_2$) and so on. In the case of an oxide-based material, there may be mentioned bismuth oxide ($Bi_2O_3$), bismuth plumbate ($Bi_2Pb_2O_5$), copper oxide (CuO), vanadium oxide ($V_6O_{13}$), lithium cobalt oxide ($LiCoO_2$), lithium nickel oxide ($LiNiO_2$), lithium manganese oxide ($LiMnO_2$), Li(NiCoMn)$O_2$, Li(NiCoAl)$O_2$, Li(NiCo)$O_2$ and so on. In addition, these may also be mixed and used.

As examples of the negative electrode active material, there may be mentioned a carbon material, specifically, artificial graphite, graphite carbon fiber, resin fired carbon, pyrolytic vapor grown carbon, coke, mesocarbon microbeads (MCMB), furfuryl alcohol resin fired carbon, polyacene, pitch-based carbon fiber, vapor grown carbon fiber, natural graphite, non-graphitizable carbon and so on. Alternatively, there may be mentioned mixtures of the above. Also, there may be mentioned metals themselves such as metallic lithium, metallic indium, metallic aluminum, or metallic silicon and so on, or alloys obtained by combining these metals with other elements or compounds.

The positive electrode and the negative electrode that constitute the solid state battery may be determined as follows. Two kinds are selected from among materials that can constitute an electrode, the two kinds of compounds are compared in respect of charge and discharge potential, and an arbitrary battery is configured by using the one exhibiting a noble potential for the positive electrode and the one exhibiting a low potential for the negative electrode.

<Method for Manufacturing Solid State Battery>

The solid state battery of the disclosure can be manufactured by disposing a solid electrolyte layer containing the solid electrolyte sheet of the disclosure between the above-described positive electrode layer and negative electrode layer, and pasting and joining them together. A joining method is not particularly limited, and there may be mentioned, for example, a method of laminating each sheet and pressing and crimping the same, or a method of pressing through between two rolls (roll to roll), and so on.

Moreover, for the purpose of improving adhesion between the solid electrolyte layer and the positive electrode layer or the negative electrode layer, an active material having ionic conductivity, or an adhesive material which does not hinder the ionic conductivity may be disposed at a joining interface.

EXAMPLES

Next, examples of the disclosure are described, but the disclosure is not limited to these examples.

Example 1

[Preparation of Solid Electrolyte Slurry]

9.7 g of powder of $Li_2S$—$P_2S_5$ (75:25 mol %) serving as a sulfide-based solid electrolyte were kneaded with 2.75 g of butyl butyrate for 1 minute to obtain a slurry. Further, 3 g of a butyl butyrate solution (binder solution) containing 10% by mass of SBR were added thereto and kneaded. In order to adjust the viscosity, 3 g of butyl butyrate were further added to obtain a solid electrolyte slurry. The obtained solid electrolyte slurry had a solid content of 54.9%.

[Fabrication of Electrolyte Sheet]

On a nonwoven fabric (material: polyethylene terephthalate, porosity: 86%, thickness: 19 μm) cut into a 100 mm square and previously fixed onto a steel sheet, coating was performed using a bar coater. After that, the butyl butyrate as the solvent was removed by drying at about 100° C. to obtain a sheet in which the solid electrolyte is filled. By hollowing out a 10 mmφ circular sheet from the obtained sheet and pressing the same using a pressing machine with a pressure of about 10 t/cm$^2$, a 10 mmφ solid electrolyte sheet having a thickness of 19 μm was obtained.

[Coming-off of Electrolyte]

Coming-off of the electrolyte of the obtained solid electrolyte sheet was evaluated by the following criteria. The results are shown in Table 1.

○: The electrolyte does not come off even if the sheet is lifted

X: The electrolyte comes off when the sheet is lifted

[Self-supporting Property]

The self-supporting property of the obtained solid electrolyte sheet was evaluated by the following criteria. The results are shown in Table 1.

○: Neither chipping of the periphery nor cracks occur in the sheet even if the sheet is pinched with tweezers X: Chipping of the periphery or cracks occur in the sheet when the sheet is pinched with tweezers

[Flexibility]

The flexibility of the obtained solid electrolyte sheet was evaluated by the following criteria. The results are shown in Table 1.

○: When the sheet is wound around a 4 φ cylinder, the electrolyte does not come off and no cracks occurs X: When the sheet is wound around a 4 φ cylinder, the electrolyte comes off or cracks occur in the sheet

[Charge and Discharge Characteristics and Resistance Value]

(Fabrication of Measurement Battery)

A negative electrode sheet and a positive electrode sheet were prepared, and a 10 mmφ circular sheet was hollowed out of each sheet. Subsequently, after the negative electrode sheet, the solid electrolyte sheet and the positive electrode sheet were laminated in this order, pressing was performed using a pressing machine with a pressure of about 10 t/cm$^2$ to produce an all solid state battery. At this time, the all solid state battery was fabricated in a completely sealed state so as not to contact the atmosphere.

(Discharge Capacity)

Under an environment of 25° C., charging was performed to 4.2 V at a current density of 0.1 C, and after that, discharging was performed to 2.5 V at a current density of 0.1 C, and a discharge capacity at this time was measured. The results are shown in Table 1.

(Resistance)

After the above discharge capacity measurement was carried out, an impedance value at the time of measurement at an alternating current frequency of 1 kHz was taken as a resistance value.

Examples 2 to 6 and Comparative Examples 1 to 2

Solid electrolyte sheets were obtained in the same manner as in Example 1 except that a polyethylene terephthalate nonwoven fabric having the porosities and thicknesses described in Table 1 was used. The various evaluations and measurements were performed on the obtained solid electrolyte sheets in the same manner as in Example 1. The results are shown in Table 1.

TABLE 1

|  | Porosity (%) | Thickness (μm) | Coming-off of Electrolyte | Self-supporting Property | Flexibility | Discharge Capacity (mAh/g) | Resistance (Ω) |
| --- | --- | --- | --- | --- | --- | --- | --- |
| Example 1 | 86 | 19 | ○ | ○ | ○ | 142 | 12 |
| Example 2 | 60 | 5 | ○ | ○ | ○ | 45 | 25 |
| Example 3 | 75 | 10 | ○ | ○ | ○ | 114 | 24 |

TABLE 1-continued

| | Porosity (%) | Thickness (μm) | Coming-off of Electrolyte | Self-supporting Property | Flexibility | Discharge Capacity (mAh/g) | Resistance (Ω) |
|---|---|---|---|---|---|---|---|
| Example 4 | 82 | 14 | ○ | ○ | ○ | 135 | 15 |
| Example 5 | 86 | 9.5 | ○ | ○ | ○ | 144 | 8 |
| Example 6 | 95 | 17 | ○ | ○ | ○ | 143 | 10 |
| Comparative Example 1 | 55 | 4.5 | Cannot fill | ○ | — | × | — |
| Comparative Example 2 | 96 | 25 | × | ○ | × | × | × |

If the porosity was 60% or less, the solid electrolyte could not be filled in the support, and fabrication of the solid electrolyte was not possible (Comparative Example 1). If the porosity was 95% or more, since there were too many voids, the solid electrolyte slipped off the sheet (Comparative Example 2).

The disclosure provides a solid electrolyte sheet in which a solid electrolyte is filled in a support, wherein the support has a porosity of 60% or more and 95% or less and a thickness of 5 μm or more and less than 20 μm.

The support may be a woven fabric or a nonwoven fabric.
The support may be a heat-resistant fiber.
The support may be formed of an aramid fiber or an $Al_2O_3$ fiber.
The solid electrolyte may contain a lithium element.
The solid electrolyte may contain at least one of phosphorus and/or sulfur.

The disclosure provides a solid state battery including a positive electrode layer containing a positive electrode active material, a negative electrode layer containing a negative electrode active material, and a solid electrolyte layer located between the positive electrode layer and the negative electrode layer, wherein the solid electrolyte layer includes the above solid electrolyte sheet.

The solid electrolyte sheet of the disclosure has a self-supporting property while having a small thickness, and is also excellent in heat resistance. Accordingly, in a manufacturing process or the like of a solid state battery using the solid electrolyte sheet of the disclosure, a short circuit can be suppressed even if pressing is performed at a high temperature exceeding, for example, 200° C. In addition, the solid electrolyte can be sintered by high-temperature pressing, and as a result, interfacial resistance can be reduced and the battery's output can be improved. Further, a thin and compact solid state battery can be formed and its energy density is high.

What is claimed is:

1. A solid electrolyte sheet, comprising:
    a support; and
    a solid electrolyte being filled in the support,
    wherein the support has a porosity of 82% or more and 95% or less,
    the support has a thickness of 9.5 μm or more and less than 20 μm, and
    the support is formed of a woven fabric, a nonwoven fabric, a heat-resistant fiber, an aramid fiber, or an $Al_2O_3$ fiber.

2. The solid electrolyte sheet according to claim 1, wherein the solid electrolyte contains a lithium element.

3. The solid electrolyte sheet according to claim 2, wherein the solid electrolyte contains at least one of phosphorus and/or sulfur.

4. A solid state battery, comprising:
    a positive electrode layer containing a positive electrode active material;
    a negative electrode layer containing a negative electrode active material; and
    a solid electrolyte layer located between the positive electrode layer and the negative electrode layer, wherein
    the solid electrolyte layer comprises the solid electrolyte sheet according to claim 1.

* * * * *